United States Patent
Bae et al.

(10) Patent No.: US 12,382,460 B2
(45) Date of Patent: Aug. 5, 2025

(54) APPARATUS AND METHOD FOR UTILIZING SEQUENCE-BASED PUCCH

(71) Applicant: Samsung Electronics Co., Ltd., Gyeonggi-do (KR)

(72) Inventors: Jung Hyun Bae, San Diego, CA (US); Mohammed Karmoose, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 390 days.

(21) Appl. No.: 17/950,684

(22) Filed: Sep. 22, 2022

(65) Prior Publication Data

US 2023/0129484 A1  Apr. 27, 2023

Related U.S. Application Data

(60) Provisional application No. 63/257,366, filed on Oct. 19, 2021.

(51) Int. Cl.
*H04W 72/21* (2023.01)
*H04L 5/00* (2006.01)
*H04W 72/1268* (2023.01)

(52) U.S. Cl.
CPC ................... *H04W 72/21* (2023.01)

(58) Field of Classification Search
CPC .............. H04W 72/21; H04W 72/1268; H04L 5/0053; H04L 5/0044
See application file for complete search history.

(56) References Cited

U.S. PATENT DOCUMENTS

| | | | |
|---|---|---|---|
| 9,001,798 B2 | 4/2015 | Papasakellariou et al. | |
| 9,560,644 B2 * | 1/2017 | Shimezawa | H04L 5/0048 |
| 9,686,067 B2 | 6/2017 | Loehr et al. | |
| 11,147,090 B2 | 10/2021 | Lunttila et al. | |
| 11,909,679 B2 * | 2/2024 | Yang | H04W 72/23 |

(Continued)

FOREIGN PATENT DOCUMENTS

| | | |
|---|---|---|
| AU | 2020327082 | 3/2022 |
| EP | 3 895 499 | 10/2021 |

(Continued)

OTHER PUBLICATIONS

Yang Yuan et al., 5G NR Control Channel Coverage Enhancement Base on Segmented Sequence Detection and Narrow Beam, 2020 IEEE 20th International Conference on Communication Technology, Oct. 2020, 6 pages.

*Primary Examiner* — Harry H Kim
(74) *Attorney, Agent, or Firm* — The Farrell Law Firm, P.C.

(57) ABSTRACT

An system and a method are disclosed for sequence-based physical uplink control channels (PUCCHs). A method includes a UE determining an uplink control information (UCI) payload to be transmitted, determining, based on the UCI payload to be transmitted, a grouping of resource sets and sequences, each sequence corresponding to a resource set, selecting one or more resource sets and one or more sequences from among the determined grouping of resource sets and sequences, according to a mapping operation, for transmitting the UCI payload, and transmitting the selected one or more sequences as part of a UCI payload transmission.

20 Claims, 6 Drawing Sheets

(56) References Cited

U.S. PATENT DOCUMENTS

| | | | |
|---|---|---|---|
| 2015/0304993 A1* | 10/2015 | Shimezawa | H04L 5/0035 |
| | | | 370/329 |
| 2020/0328869 A1* | 10/2020 | Liu | H04W 56/001 |
| 2021/0092734 A1 | 3/2021 | Yang et al. | |
| 2021/0105766 A1 | 4/2021 | Wang et al. | |
| 2021/0144743 A1 | 5/2021 | Rastegardoost et al. | |
| 2021/0320761 A1 | 10/2021 | Yang et al. | |
| 2021/0321456 A1 | 10/2021 | Yang et al. | |
| 2022/0116953 A1 | 4/2022 | Kim et al. | |
| 2022/0150950 A1 | 5/2022 | Islam et al. | |
| 2022/0294597 A1* | 9/2022 | Ibrahim | H04L 5/14 |
| 2022/0322400 A1* | 10/2022 | Hu | H04W 72/30 |
| 2023/0006776 A1* | 1/2023 | Yang | H04L 1/00 |
| 2024/0121717 A1* | 4/2024 | Su | H04W 72/044 |

FOREIGN PATENT DOCUMENTS

| | | |
|---|---|---|
| WO | WO 2021/023091 | 2/2021 |
| WO | WO 2021/030804 | 2/2021 |
| WO | WO 2021/091966 | 5/2021 |

\* cited by examiner

APPARATUS AND METHOD FOR UTILIZING SEQUENCE-BASED PUCCH

CROSS-REFERENCE TO RELATED APPLICATION(S)

This application claims the priority benefit under 35 U.S.C. § 119(e) of U.S. Provisional Application No. 63/257,366, filed on Oct. 19, 2021, the disclosure of which is incorporated by reference in its entirety as if fully set forth herein.

TECHNICAL FIELD

The disclosure generally relates to sequence-based physical uplink control channels (PUCCHs). More particularly, the subject matter disclosed herein relates to improvements to the coverage of sequence-based PUCCH transmissions, which is extended to allow the UE to carry larger sized uplink control information (UCI) payloads.

SUMMARY

In the $3^{rd}$ generation partnership project (3GPP) standard for new radio (NR), a user equipment (UE) is designed to receive different downlink (DL) signals from a base station (gNB). In NR, a UE receives a DL transmission including a variety of information from the gNB. In particular, the UE receives user data from the gNB in a particular configuration of time and frequency resources known as a physical downlink shared channel (PDSCH).

A multiple access (MAC) layer provides user data that is intended to be delivered to a corresponding layer at the UE side. A physical (PHY) layer of the UE takes a physical signal received on the PDSCH as input to a PDSCH processing chain.

Similarly, the UE receives control data from the gNB in a physical downlink control channel (PDCCH). The control data, which may be referred to as downlink control information (DCI), is converted into the PDCCH signal through a PDCCH processing chain on the gNB side.

Conversely, a UE sends uplink (UL) signals to convey user data or control information, which may be respectively referred to as a physical uplink shared channel (PUSCH) and a physical uplink control channel (PUCCH). The PUSCH is used by the UE MAC layer to deliver data to the gNB, and the PUCCH is used to convey control data, which may be referred to as UCI, which is converted to the PUCCH signal through a PUCCH processing chain at the UE side.

A UE can be scheduled a PUSCH transmission through a dynamic grant (DG), a configured grant type 1 (CG1), or a configured grant type 2 (CG2). In addition, a PUSCH can be scheduled for transmission with repetition.

Generally, there are two repetition mechanisms for PUSCH transmission in 3GPP Rel-16 NR. In a Type A repetition, the UE is scheduled with a set of K repetitions, and the UE attempts to transmit K PUSCH transmissions in K consecutive slots. If one of the K slots is not available for UL transmission, the transmission is dropped.

In a Type B repetition, the UE is scheduled with a set of K nominal repetitions. The UE determines a set of K actual PUSCH transmission occasions, which are not necessarily in different slots. If one of the K slots is not available for UL transmission, the transmission is dropped. A PUSCH is typically configured with a set of demodulation reference signal (DMRS) resources, which the gNB uses for channel estimation procedure prior to decoding the PUSCH.

Another aspect of 3GPP Rel-16 NR is the ability to perform carrier aggregation (CA), such that a UE may use multiple component carriers (CCs) for transmission, allowing the UE to utilize a larger bandwidth than possible using a single CC. For example, Rel-16 NR allows multiple modes of CA:

- Intra-band frequency aggregation with contiguous CCs
- Intra-band frequency aggregation with non-contiguous CCs
- Inter-band frequency aggregation with non-contiguous CCs.

The aforementioned categorization of CA modes are dependent on the collection of bands containing the used CCs. This collection of bands is referred to as the band combination.

In NR, CA is applied across cells. The UE initially connects to a cell in the CA, which is referred to as a primary cell (PCell). Thereafter, the UE discovers and connects to one or more other cells in the CA, referred to as secondary cells (SCells).

With CA, the UE is able to use each cell for transmission/reception of different combinations of signals. For example, a UE can send/receive a PUSCH on one cell and send/receive a sounding reference signal (SRS) on another cell. However, 3GPP Rel-16 NR specifies certain timeline rules and conditions for such simultaneous transmission/reception of signals in CA.

In addition, even with timeline rules and requirements, 3GPP Rel-16 NR does not mandate that every NR-connected UE is able to perform such simultaneous usage of CCs in CA. Instead, a UE may have the capability to perform certain transmission/reception tasks in CA, while not having the capability to perform other tasks.

Another factor that may affect the UE capability is whether frequency division duplexing (FDD) or time division duplexing (TDD) is assumed. A UE may be able or unable to perform a task on FDD bands (or band combinations), while being unable or able to perform the same task on TDD bands (or band combinations).

To fully utilize UEs' capabilities and better-optimize the use of the network, a gNB may be informed of the UEs' capabilities, which are then taken into account when the gNB schedules transmission/reception of the UEs in the network.

To increase the coverage of PUCCH transmissions, one approach is to rely on sequence-based formats for PUCCH signals. While PUCCH Format 0 is a sequence-based format that is specified in Rel-16 NR, it only allows for transmission of at most 2 bits of control information, e.g., hybrid automatic repeat request (HARQ) acknowledgement/negative acknowledgement (ACK/NACK) information.

According to an aspect of the present disclosure, this approach can be extended to allow the UE to carry UCI payloads of larger sizes. That is, mechanisms are provided to allow for PUCCH transmissions in the form of sequence transmissions, which can support carrying UCI payloads of more than 2 bits.

In an embodiment, a method includes a UE a UE determining an uplink control information (UCI) payload to be transmitted, determining, based on the UCI payload to be transmitted, a grouping of resource sets and sequences, each sequence corresponding to a resource set, selecting one or more resource sets and one or more sequences from among the determined grouping of resource sets and sequences, according to a mapping operation, for transmitting the UCI payload, and transmitting the selected one or more sequences as part of a UCI payload transmission.

In an embodiment, a UE includes a transceiver; and a processor configured to determine an uplink control information (UCI) payload to be transmitted, determine, based on the UCI payload to be transmitted, a grouping of resource sets and sequences, each sequence corresponding to a resource set, select one or more resource sets and one or more sequences from among the determined grouping of resource sets and sequences, according to a mapping operation, for transmitting the UCI payload, and transmit, via the transceiver, the selected one or more sequences as part of a UCI payload transmission.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
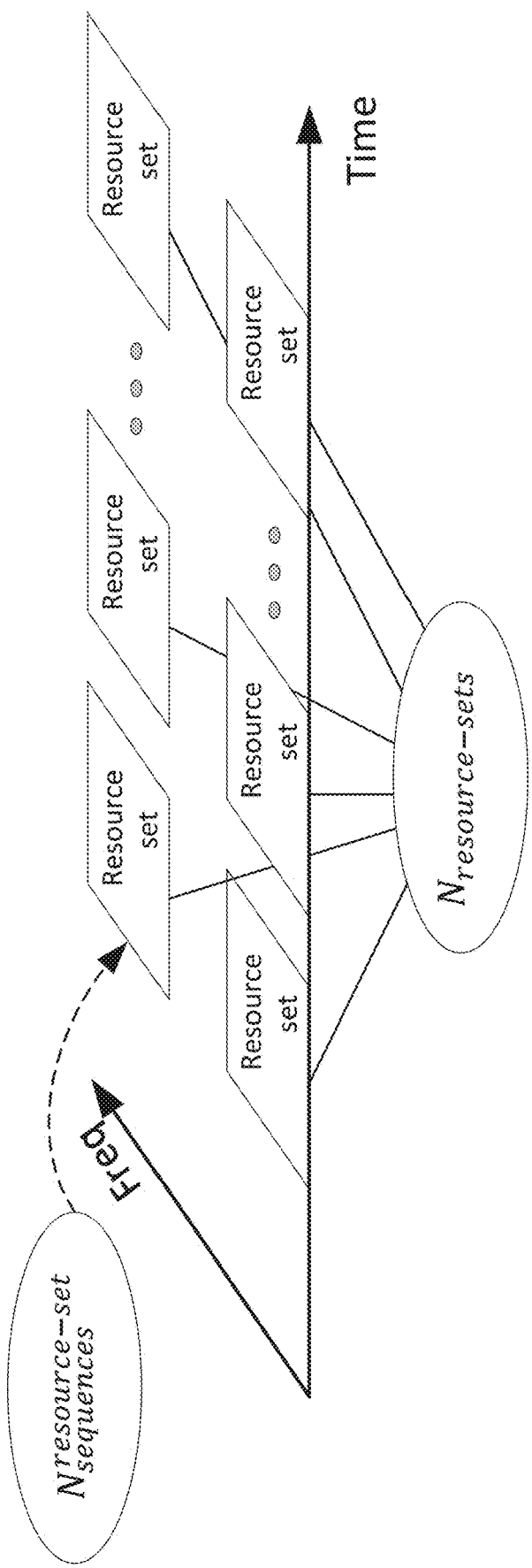
FIG. 1 illustrates assumptions related to a sequence-based PUCCH transmission setup, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

In the disclosure, the following assumptions and notations are used.

A UCI payload of size $N_{payload}$ bits are conveyed by the PUCCH transmission.

A transmission of a sequence-based transmission may involve the following steps.

Step 1. Selection of a particular set of parameter values, which determines a sequence to be used for a transmission by a UE. For example, considering a transmission using PUCCH Format 0, parameters can include a cyclic shift to be used in the generation of the sequence to be transmitted by the UE. This step may simply be referred to as selecting a sequence. However, this step does not necessarily mean that the UE also determines time/frequency resources to be used for the transmission of the sequence. If the UE is to send multiple sequences, the UE should select multiple sequences.

Step 2. Determination of time/frequency resources to be used for the transmission of the selected sequences. For example, this refers to the determination of PUCCH resources to be used for transmitting the selected sequence in case of transmitting PUCCH Format 0. If multiple sequences are selected in the previous step, then there should be a determination of resources for each of the selected sequences.

In each set of resources reserved for transmitting sequences, there can be a number of available sequences to be selected from. Unless indicated otherwise, it is assumed herein that different sets of resources reserved for transmitting sequences support transmitting the same set of available sequences. For example, consider an orthogonal frequency-division multiplexing (OFDM) symbol/physical resource block (OS/PRB) pair configured for transmitting PUCCH Format 0, wherein each such pair supports transmission of the same set of length-12 computer-generated sequences (CGS), which are distinguished by their respective cyclic shift values.

In this case, the set of available sequences per resource set can be labelled using unique indices, e.g., sequence indices. Herein, a number $N_{sequences}^{resource-set}$ of different sequences can be transmitted in one set of resources. For example, in the case of PUCCH Format 0, one PUCCH resource set contains $N_{sequences}^{resource-set}=12$, which are labelled by sequence indices 0, 1, . . . , 11.

A number of resource sets can be configured for the transmission of a UCI payload, i.e., $N_{resource-set}$. Sending any realization of the UCI payload may include sending sequences from one or more of the resource sets. The collection of the resource sets may be labelled using resource set indices, e.g., 0, 1, . . . , $N_{resource-set}-1$. Each of the $N_{resource-set}$ resource sets can support the transmission of $N_{sequences}^{resource-set}$ as described above.

FIG. 1 illustrates assumptions related to a sequence-based PUCCH transmission setup, according to an embodiment.

In accordance with an embodiment of the disclosure, a UE may transmit a set of N sequences that correspond to a particular realization of the $N_{payload}$ bits constituting the UCI payload. The N sequences are eventually transmitted in certain resources that are available for the PUCCH transmission. The UE determines the N sequences and their corresponding transmission resources via a pool of available sequence opportunities (SOs), which a size of the pool is S. That is, SOs in the SO pool are indexed from 1 to S. The UE then selects a set of N SOs out of the pool, and those SOs allow the UE to determine the sequences and their corresponding resources.

Each SO in the in the pool may correspond to a unique transmission of a sequence, e.g., a sequence index and a resource set index, or may correspond to a unique sequence index. These different cases will be described below.

Case 1—Each SO in the Pool Corresponds to a Unique Transmission of a Sequence

In this case, the term SO refers to a transmission of a sequence in a manner that is uniquely identified by a receiver from other potential transmissions corresponding to other SOs. For example, an SO includes a sequence index and a resource set index, with which the receiver can distinguish any two SOs, i.e., any two sequence/resource set pairs, without ambiguity.

For $N_{payload}$ UCI bits, there are $2^{N_{payload}}$ possible realizations of the UCI. Therefore, a unique selection of N SOs out of the pool of S SOs for each possible realization should be available. Assuming that any selection of N SOs is a valid combination for a corresponding UCI payload realization, this puts a restriction that the following relation has to hold $\binom{S}{N} \geq 2^{N_{payload}}$. As will be discussed in more detail below, certain combinations of SOs may not be desirable, and therefore, certain selections of SOs may not be valid combinations for mapping to UCI payload realizations, in which case the aforementioned restriction can be further tightened.

Using the bound above, however, does not exclude the possibility that a UE can simultaneously transmit multiple sequences in the same resource set. Mapping of an SO to the actual transmitted sequences and used resource sets may be straightforwardly determined based on the sequence index and resource set index of the SOs.

For example, consider the case of $N_{payload}=11$ and resource sets that are similar to the PUCCH resource sets used for transmitting PUCCH Format 0, i.e., a resource set consists of one OS/PRB pair (12 REs). It is also assumed that any combination of N SOs in the pool is a valid combination. In this case, the amount of resources needed for sending sequence-based PUCCH for this payload size is shown in Table 1.

TABLE 1

| N | 1 | 2 | 3 | 4 | 5 |
|---|---|---|---|---|---|
| $S\left(\text{smallest value satisfying} \binom{S}{N} \geq 2^{N_{payload}}\right)$ | 2048 | 65 | 25 | 17 | 15 |
| # Resource sets needed $\left(\left\lceil \frac{S}{12} \right\rceil\right)$ | 171 | 6 | 3 | 2 | 2 |
| Number of OSs (assuming to FDM of resource sets) | 171 | 6 | 3 | 2 | 2 |

Alternatively, there can be some restrictions on the valid combinations of SOs that map to UCI payload realizations. For example, there can be a restriction that no two sequences in the combination of SOs can map to the same resource set, which prevents the UE from transmitting more than one sequence in the same resource set. In this case, the number of resource sets $N_{resource\text{-}set}$ is at least equal to N. Moreover, there are $$12^N \binom{N_{resource\text{-}sets}}{N}$$

available valid combinations of SOs, which specifies that $N_{resource\text{-}set}$ should at least satisfy that $$12^N \binom{N_{resource\text{-}sets}}{N} \geq 2048.$$

In this case, the amount of resources needed for sequence-based PUCCH transmission is shown in Table 2.

TABLE 2

| N | 1 | 2 | 3 | 4 | 5 |
|---|---|---|---|---|---|
| # Resource sets needed ($N_{resource\text{-}sets}$ = max(N, M*) where M* is the smallest M satisfying $12^N \binom{M}{N} \geq 2048$) | 171 | 6 | 3 | 4 | 5 |
| $S = 12 N_{resource\text{-}sets}$ | 2052 | 72 | 36 | 48 | 60 |

Case 2—Each SO in the Pool Correspond to a Unique Sequence Index

In this case, selecting SOs from the pool determines sequences used for transmission, without specifying associated resource sets. The selected set of SOs may uniquely map to a UCI payload realization, or the selected set of SOs may not uniquely map to a UCI payload realization, but then associating the sequence to a resource set is needed.

More specifically, when the selected set of SOs uniquely maps to a UCI payload realization, a design target is that the pool of available sequences should be large enough to accommodate the number of payload realizations, without taking into account the resource sets used for transmitting those sequences, which is information that the receiver can use to distinguish transmissions. Such an operation may require a sufficiently large number of orthogonal and unique sequences in order to accommodate the UCI payload size. This can also require the use of longer sequences to attain such a large number.

For example, assuming $N_{payload}=11$, then S=65 sequences are needed for N=2. However, because the elements in the pool of size S are sequence indices, each combination of 2 sequences should be unique. Consequently, using legacy sequences of length 12 does not provide a sufficiently large pool of available sequences, and new sequence designs may be needed.

When the selected set of SOs does not uniquely map to a UCI payload realization, and associating the sequence to a resource set is needed, sending a sequence x in a resource set A is considered as a different transmission than sending the same sequence x in a resource set B. In this case, permutations of the set of sequence combinations selected from the pool in their associations to resource sets give different mappings to UCI payload realizations.

For example, consider the case of $N_{payload}=11$, and assume that legacy sequences of length 12 used for PUCCH Format 0 are used and that there are M available resource sets. In this case, considering one sequence combination for one UCI payload realization, if multiple sequences can be transmitted from the same resource set, then there is a pool of $12 N_{resource\text{-}sets}$ sequences from which to pick N sequences. The smallest $N_{resource\text{-}sets}$ should therefore satisfy $$12^N \binom{N_{resource\text{-}sets}}{N} \geq 2048.$$

The corresponding values of $N_{resource\text{-}sets}$ are shown in Table 3.

TABLE 3

| N | 1 | 2 | 3 | 4 | 5 |
|---|---|---|---|---|---|
| $N_{resource\text{-}sets}$ (smallest M satisfying $\binom{12M}{N} \geq 2048$) | 171 | 6 | 3 | 2 | 2 |

However if only one sequence is allowed per resource set, then the number of available sequence combinations is $$12^N \binom{N_{resource\text{-}sets}}{N},$$

which should be larger than 2048, in addition to the fact that $N_{resource\text{-}sets} \geq N$. The corresponding values of M are shown in Table 4.

TABLE 4

| N | 1 | 2 | 3 | 4 | 5 |
|---|---|---|---|---|---|
| # Resource sets needed ( $N_{resource\text{-}sets}$ = max(N, M*) where M* is the smallest M satisfying $12^N \binom{M}{N} \geq 2048$) | 171 | 6 | 3 | 4 | 5 |

Although the two approaches described in Cases 1 and 2 above are feasible for a mapping operation of sequence-based PUCCH transmissions, Case 1 will be used as an example below for describing various mapping operations.

In accordance with an embodiment of the disclosure, the mapping of UCI payloads to SO combinations may be performed using an index specifying an SO combination.

More specifically, assuming an SO pool size of S, where the elements of the pool are indexed from 1 to S, one selection of N SOs of the pool of SOs may be described as a set of N indices, $k_i$, $i=0, \ldots, N-1$, where $k_i \in \{1, \ldots, S\}$ and $k_i < k_{i+1}$ for all i.

For each combination of N SOs, a corresponding unique index can be computed as shown in Equation (1).

$$r = \sum_{i=0}^{N-1} \left\{ \begin{matrix} S - k_i \\ N - i \end{matrix} \right\} \quad (1)$$

In Equation (1), $$\left\{ \begin{matrix} n \\ k \end{matrix} \right\} = \begin{cases} \binom{n}{k} & n \geq k \\ 0 & \text{otherwise} \end{cases},$$

and r represents an SO combination index.

Each UCI payload realization is mapped to a unique value of r, which corresponds to a unique combination of N SOs, one which is described by the corresponding value of $k_i$, i=0, ..., N−1, which satisfies the above relation. One method of providing this mapping is by mapping the value of r to the UCI payload realization that is equal to a binary representation of the value of r.

As described above, the notion of an SO is introduced to refer to the selection of a particular sequence index in a particular resource set. However, this particular definition of an SO is not necessarily the only one.

For example, an SO may indicate an opportunity for transmission of a sequence such that the transmissions in two distinct SOs are differentiable by the receiver. That is, an SO can indicate {time resources, frequency resources, carrier information, sequence root index, sequence cyclic shift}. In this case, two SOs can share values corresponding to multiple of the aforementioned attributes and only differ in one, which can still render them differentiable by the receiver. For example, if two SOs only differ in the frequency resources, the receiver can still identify the transmissions corresponding to each of the SOs by observing the frequency resources used in either cases.

Additionally, the generalized notion of an SO can retain the notion of a resource set. Namely, an SO can indicate an attribute that is related to a resource set, along with attributes that are related to different information about the transmission opportunity, e.g., root index, cyclic shifts, etc.

As a possible generalization, an SO can be designated by information about the selected preamble (e.g., preamble length, root index, or cyclic shift) and/or information about the used resources (e.g., time resources, frequency resources, antenna port information, or resource set). Herein, it should be noted that the notion of an SO can be generalized, despite any explicit referencing to the notion of a resource set.

In accordance with an embodiment of the disclosure, ordering operations may be provided for SOs within an SO pool.

Namely, it is assumed that one SO corresponds to at least one sequence index and one resource set index. This can be described by an (RS, SI) pair for each SO, where RS corresponds to the resource set label and SI correspond to the sequence index.

Based on the foregoing, the following ordering operations may be provided.

Resource-Set-Then-Sequence-Index (RSTSI)
  Order SOs according to their corresponding resource set label first.
  Thereafter, order SOs according to their sequence index.
  In this ordering, the SOs may be ordered as follows: (0,0), (1,0), (2,0), ..., ($N_{resource-set}$−1,0), (0,1), (1,1), ....

Sequence-Index-Then-Resource-Set (SITRS)
  Order SOs according to their corresponding sequence index first.
  Thereafter, order SOs according to their resource set label.
  In this ordering, the SOs may be order as follows: (0,0), (0,1), (0,2), ..., (0, $N_{sequences}^{resource-set}$−1), (1,0), (1,1), ....

Using the generalized notion of an SO, one SO can have many corresponding attributes. In this case, hierarchical ordering can be performed for the SOs within the SO pool by ordering SOs as per a particular sequential ordering of the attributes of the SOs, such as by:
  Ordering SOs according to their time resources (e.g., earlier time resources) first.
  Then, ordering SOs according to their frequency resources (e.g., smaller frequency resource index first).
  Then, ordering SOs according to their root index values.
  Then, ordering SOs according to their cyclic shift values.
  Many other orderings of SOs can also be provided.

When the notion of an SO include a resource set along with other attributes, then ordering can also be based on the ordering techniques mentioned above for the concept of a resource set, along with orderings for other attributes.

For example, the ordering can be performed in terms of resource sets first (e.g., according to the techniques above) and then according to other attributes, or the ordering can be performed in terms of other attributes first, and then according to resource sets first (e.g., according to the techniques above).

In accordance with an embodiment of the disclosure, UCI payload realizations may be mapped to different SO combinations.

For example, for a UCI payload of size $N_{payload}$ bits, there are $2^{N_{payload}}$ different realizations. In addition, a UCI payload may include information bits that are obtained from different sources. For example, a UCI payload may include HARQ feedback bits, channel state information (CSI) bits, scheduling request (SR) bits and/or others. A UCI payload may include one or multiple of the different types of bits. Additionally, the types of bits can have varying levels of importance. For example, HARQ feedback bits can have higher importance level than CSI bits.

Before describing the mapping operations, it is noted that when one SO is selected, there is a chance that a receiver mistakes the detection of that SO with another SO. This event may be referred to as decoding confusion. Consider, for example, the case of using sequences used for PUCCH Format 0, where there are 12 sequences in one PUCCH resource set. When transmitting one sequence corresponding to one cyclic shift, due to the imperfect wireless channel, a receiver can mistakenly detect a sequence corresponding to a different cyclic shift. As such, there is a particular level of decoding confusion between the two sequences. The level of decoding confusion between the two sequences may depend on, e.g., how far the two cyclic shifts are. As another example, two sequences on two different PUCCH resource sets have very low decoding confusion.

For the purpose of describing the different schemes below, a crude characterization is provided of decoding confusion between different SOs in terms of probability of erroneously detecting one SO for another. Specifically, it is assumed that two SOs labelled as $SO_i=(RS_i,SI_i)$ and $SO_j=(RS_j,SI_j)$. Then we denote by $SO_i \rightarrow SO_j$ the event that $SO_i$ is erroneously decoded as $SO_j$. Then, it is assumed that $Pr\{SO_i \rightarrow SO_j\}=0$, where $RS_i \neq RS_j$, which means that two SOs do not exhibit decoding confusion when they belong to different resource sets.

Moreover, the use of sequences similar to PUCCH Format 0 is assumed.

Figure 2:
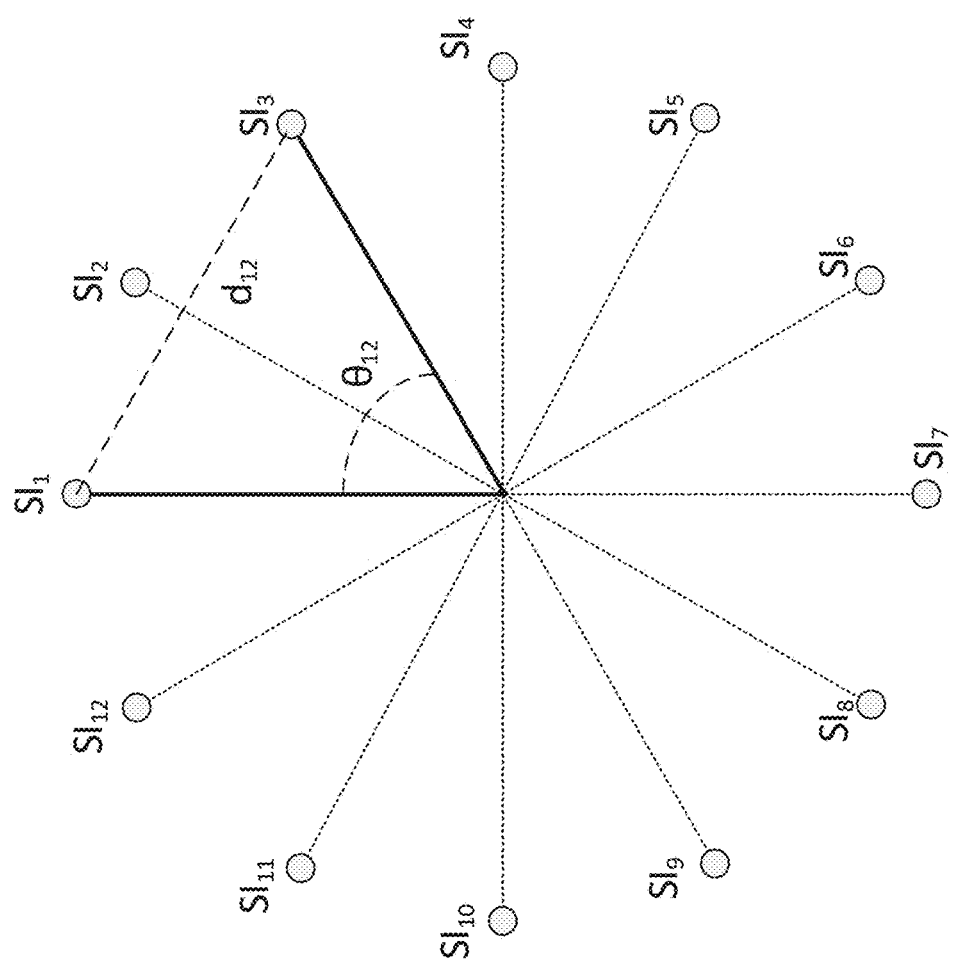
FIG. 2 illustrates an example of labeling sequence indices of sequences in a resource set, according to an embodiment.

FIG. 2 illustrates an example of labeling sequence indices of sequences in a resource set, according to an embodiment.

Referring to FIG. 2, the sequence indices of all 12 sequences in one resource set are labelled according to their corresponding cyclic shifts. In this case, it is assumed that the probability of a decoding confusion between two sequences is related to the distance between the values of their corresponding cyclic shifts. Namely, it is assumed that $$Pr\{SO_i \rightarrow SO_j\} = 1 - (1 - p_{min})\sin\frac{|\theta_{ij}|}{2},$$

where $p_{min}$ is a parameter indicating a quality of the wireless channel, and $\theta_{ij}$ is the angle between cyclic shifts $SI_i$ and $SI_j$.

Figure 3:
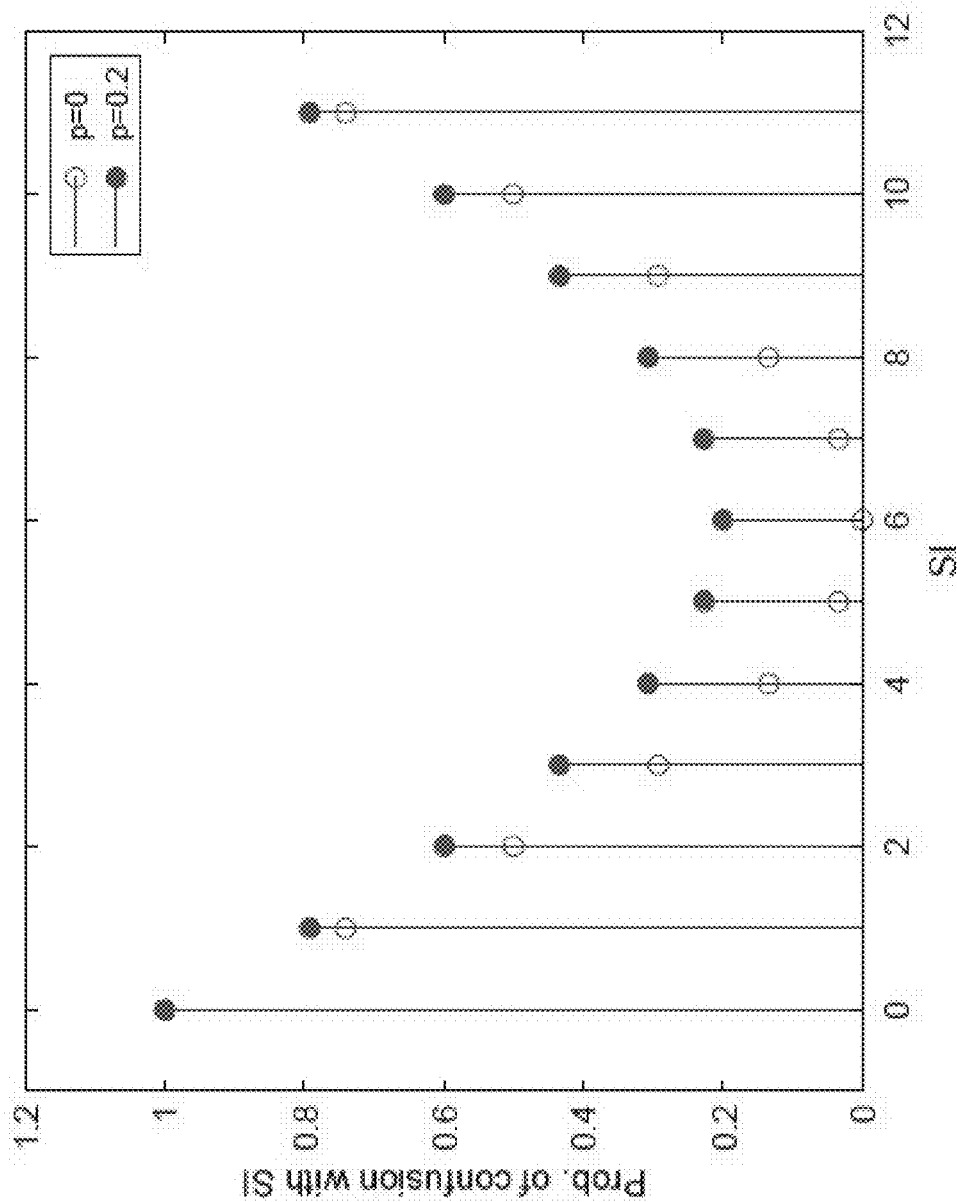
FIG. 3 is a graph illustrating a probability of decoding confusion when $SI_i=0$ and assuming that $p=0$ and $p=0.2$, according to an embodiment.

FIG. 3 is a graph illustrating a probability of decoding confusion when $SI_i=0$ and assuming that p=0 and p=0.2, according to an embodiment.

Referring again to the mapping aspect, when decoding confusion happens between two SOs, if the resultant SO combination decoded by the receiver maps to a valid UCI payload realization, then a UCI payload decoding error occurs. In order to reduce the likelihood that high priority UCI bits are erroneously decoded when decoding confusion of SOs occurs, a method for mapping, which preserves high priority bits can be as follows:

Determine sets of SO combinations which have pairs of SOs that have decoding confusion.

Map UCI payloads to those sets in a way that maintains the same realization/value of high important bits across the SO combinations in those sets.

For example, start by considering the following straightforward mapping between UCI payload realizations and SO combinations in the case of $N_{payload}=11$, N=2, and the use of length-12 sequences similar to PUCCH Format 0. Herein, it is assumed that there exists $N_{resource-sets}=6$ resource sets, each with 12 available sequences.

The mapping is performed as follows:
1. Order SOs in the pool of SOs according to SITRS.
2. Create an SO combination index for each possible SO combination consisting of N=2 SOs per combination, as described above.
3. Map UCI payload realizations to SO combination indices according to the following rule:
   Decimal value of UCI payload realization=SO combination index Thereafter, the reliability of transmitting each of the UCI payload bits is evaluated according to the mapping operation. This may be done by characterizing the probability of incorrectly determining the value of the kth bit of the UCI payload, where k=1, ..., $N_{payload}$. The probability may be denoted by $p_{e_k}$, which is computed using Equation (2).

$$p_{e_k} = \frac{1}{2^{N_{payload}} \times 2^{N_{payload}}} \sum_{i,j \in \{1,...,2^{N_{payload}}\}} Pr\{U_i \to U_j\}\mathbb{1}[\{U_i(k) \to U_j(k)\}] \quad (2)$$

In Equation (2), the summation is over all pairs of UCI payload realizations, one UCI payload realization $U_i$ as the actual realization, and one UCI payload realization $U_j$ as the erroneously detected one. The event $U_i \to U_j$ is the event in which UCI payload realization $U_i$ is mistakenly detected as realization $U_j$. Additionally, $\mathbb{1}\{x\}$ is an indicator function, which is equal to 1 if x is true.

Note that $U_i$ corresponds to the SO combination including $SO_i^1$ and $SO_i^2$, and similarly $U_j$ corresponds to the SO combination including $SO_j^1$ and $SO_j^2$. From this, Equation (3) may be obtained.

$$Pr\{U_i \to U_j\} = \qquad (3)$$
$$\frac{1}{2}Pr\{SO_i^1 \to SO_j^1, SO_i^2 \to SO_j^2\} + \frac{1}{2}Pr\{SO_i^1 \to SO_j^2, SO_i^2 \to SO_j^1\} =$$

-continued
$$\frac{1}{2}Pr\{SO_i^1 \to SO_j^1\}Pr\{SO_i^2 \to SO_j^2\} + \frac{1}{2}Pr\{SO_i^1 \to SO_j^2\}Pr\{SO_i^2 \to SO_j^1\}$$

Thereafter, the probability of decoding confusion between SOs assumed above can be reused to provide Equation (4).

$$Pr\{SO_i \to SO_j\} = \begin{cases} 0 & \text{if } RS_i \neq RS_j \\ 1 - (1 - p_{min})\sin\frac{|\theta_{ij}|}{2} & \text{if } RS_i = RS_j \end{cases} \quad (4)$$

Figure 4:
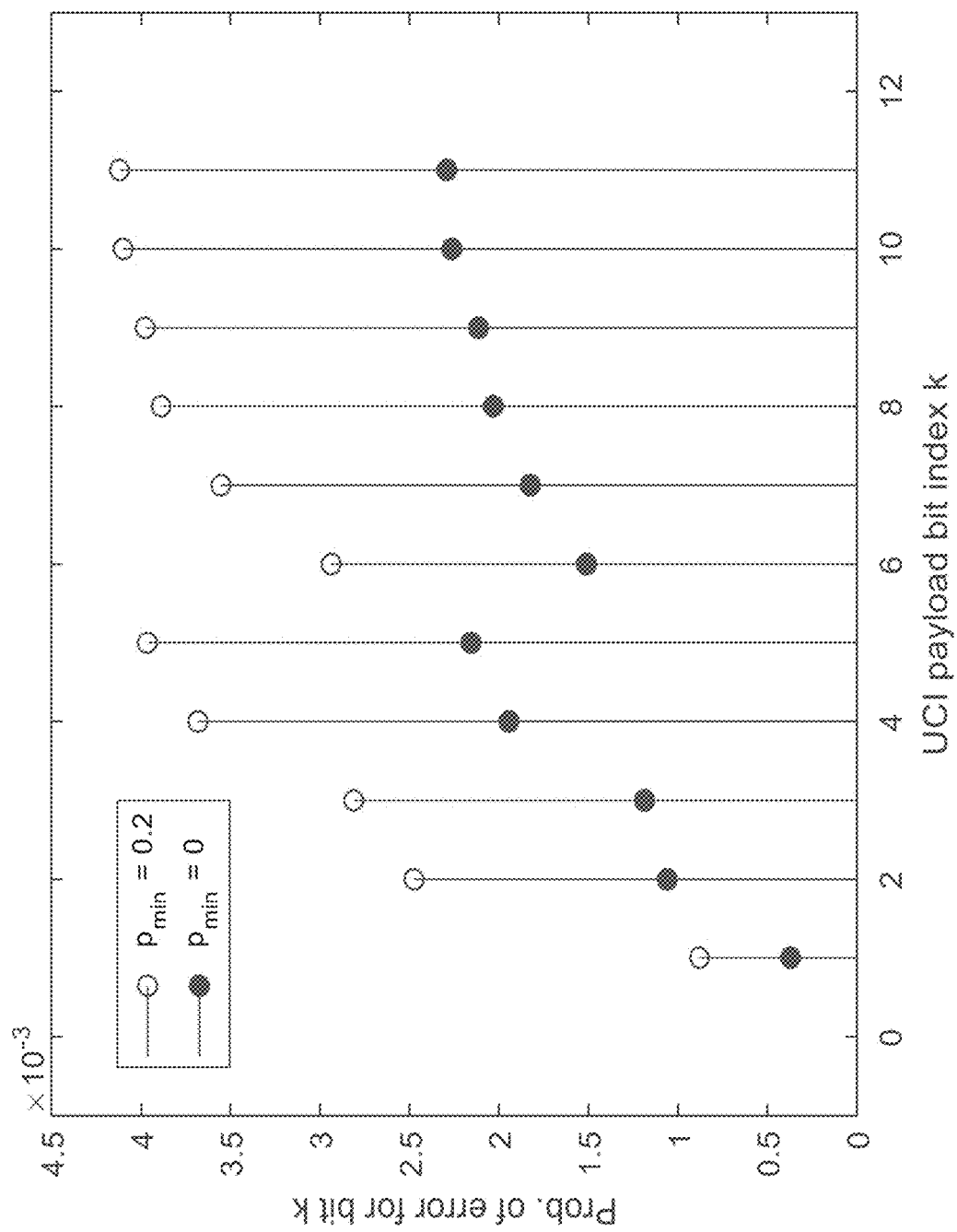
FIG. 4 is a graph illustrating a probability of error for each UCI payload bit, according to an embodiment.

FIG. 4 is a graph illustrating a probability of error for each UCI payload bit, according to an embodiment.

Referring to FIG. 4, using Equations (2) to (4), the probability of error for each UCI payload bit, assuming that $p_{min}=0$ and 0.2, may be evaluated.

As illustrated in FIG. 4, there are varying levels of reliability for different locations in the UCI payloads. According to the above evaluations, the bit locations may be rated from highest to lowest reliability as shown in Table 5, and the UCI payload bits with higher priority may be mapped to higher reliability bits.

TABLE 5

| | Reliability ranking | | | | | | | | | | |
|---|---|---|---|---|---|---|---|---|---|---|---|
| | 1 | 2 | 3 | 4 | 5 | 6 | 7 | 8 | 9 | 10 | 11 |
| Bit location | 1 | 3 | 3 | 6 | 7 | 4 | 8 | 9 | 5 | 10 | 11 |

Mapping 1

In accordance with an embodiment of the disclosure, SOs may be mapped in a hierarchical manner depending on the various components which constitute one SO. For example, when an SO is characterized by {sequence index, resource set ID}, mapping of UCI payloads to SO combinations can be performed such that, by only identifying the resource sets associated with the SOs in the SO combination, the receiver can deduce some of the bits of the UCI payload. Accordingly, hierarchical mapping may provide higher reliability in decoding UCI bits that can be deduced by only determining the resource sets.

A first case considers SO combinations, wherein no two sequences can be selected from the same resource set, i.e., the resource sets of all SOs in the SO combination are different. Consequently, each sequence should be transmitted using a different resource set, and therefore, N resource sets are used for each SO combination.

To facilitate this mapping, a resource set combination index $r_{res}$ may be introduced. Similar to the SO combination index, this index indicates the selection of a pair of resource indices. Namely, assuming a set of $N_{resource-sets}$ resource sets, one selection of N resource sets is described as a set of N indices, $k_i$, i=0, ..., N−1 where $k_i \in \{1, ..., N_{resource-sets}\}$ and $k_i < k_{i+1}$ for all i. Then, for each combination of N resource sets, a corresponding unique index can be computed as shown in Equation (5).

$$r_{res} = \sum_{i=0}^{N-1} \binom{N_{resource-sets} - k_i}{N - i}$$

In Equation (5), $$\begin{Bmatrix}n\\k\end{Bmatrix} = \begin{cases}\binom{n}{k} & n \geq k \\ 0 & \text{otherwise}\end{cases}.$$

Using the notion of resource set combination index, mapping between combinations of N resource set pairs and $r_{res}$ may be performed as follows.

Assume that the selection of N resource sets is represented by a binary selection vector of length $N_{resource-sets}$, where a 1 in the ith bit position indicates that the ith resource set is selected, and a 0 in the ith bit position indicates that the ith resource set is not selected. Thereafter, mapping may be performed according to the following rule:

Decimal value of the binary selection vector=resource set combination index

Using the concept of a resource set combination index, the selection of an SO combination may correspond to selecting a set of N resource sets, and one sequence for each resource set. Within a set of N resource sets, there are $(N_{sequences}^{resource-set})^N$ possible selections of N sequences, one from each resource set. To help identify these pairs, the notion of a sequence combination index sc may be defined as follows.

For a combination of N resource sets, the resource sets are ordered such that the ith resource set is the resource set among the N resource sets with the ith-lowest resource set identifier (ID). The sequence combination index sc may be defined as shown in Equation (6) below, where $d_i$ represents an index of the sequence selected from the ith resource set, and $d_i \in \{1, \ldots, N_{sequences}^{resource-set}\}$.

$$sc = \sum_{i=1}^{N} d_i \cdot (N_{sequences}^{resource-set})^{i-1} \tag{6}$$

Using this index, for each set of N resource sets, every possible combination of N sequences, one from each resource set and defined by the parameters $d_i$, $i \in \{1, \ldots, N\}$, can have a unique sequence combination index sc which satisfies the above-described relation.

The UCI payload mapping operation may be performed as follows.

1. Initialize UCI payload parameter P to be 0.
2. Initialize resource set parameter $r^{param}=0$.
3. Initialize sequence combination parameter $sc^{param}=0$.
4. While $P \leq 2^{N_{payload}}$:
   a. Set $r=r^{param}$.
   b. Set $sc=sc^{param}$;
   c. Assign UCI payload equal to the binary representation of P to the SO combination with resource sets corresponding to the resource set combination index r and with sequence combination corresponding to the sequence combination index sc;
   d. Increment P;
   e. Increment $sc^{param}$; and
   f. If $sc^{param} > (N_{sequences}^{resource-set})^N$:
      i. Set $sc^{param}=0$, and
      ii. Increment $r^{param}$ An example of this mapping procedure is provided below for $N_{payload}=11$, $N_{sequences}^{resource-set}=6$, and N=2. As seen from the resultant mapping in Table 6 below, the resource set combination can reveal some information about up to 3 bits of the UCI payload. However, this information is not consistent for every possible resource set combination, e.g., for 2-5 pair nothing is revealed.

TABLE 6

| Resource set pair | Which bit indices are uniquely determined | What value |
|---|---|---|
| 1-2 | 1 2 3 | 0 0 0 |
| 1-3 | 1 2 | 0 0 |
| 1-4 | 1 2 3 | 0 0 1 |
| 1-5 | 1 | 0 |
| 1-6 | 1 2 3 | 0 1 0 |
| 2-3 | 1 2 | 0 1 |
| 2-4 | 1 2 3 | 0 1 1 |
| 2-5 | 0 | — |
| 2-6 | 1 2 | 1 0 |
| 3-4 | 1 2 3 | 1 0 1 |
| 3-5 | 1 | 1 |
| 3-6 | 1 2 3 | 1 1 0 |
| 4-5 | 1 2 | 1 1 |
| 4-6 | 1 2 3 | 1 1 1 |
| 5-6 | 1 2 3 4 5 | 1 1 1 1 1 |

Such a shortcoming can be circumvented by altering the mapping operation and by satisfying a further constraint on the number of configured resources. Namely, let $N_{payload}=N_{payload}^1+N_{payload}^2$, and the goal is to use a mapping procedure that allows for the determination of $N_{payload}^1$ bits of the UCI payload by only examining the resource sets, while the remaining $N_{payload}^2$ are determined by examining the sequences. In order to achieve this, the constraints in Equations (7) and (8) should be met for some $q \in \mathbb{Z}^+$.

$$\binom{N_{resource-set}}{N} \geq q \cdot 2^{N_{payload}^1} \tag{7}$$

$$(N_{sequences}^{resource-set})^N \geq \frac{2^{N_{payload}^2}}{q} \tag{8}$$

The first condition in Equation (7) ensures that the number of resource set combinations of size N are sufficient, such that all $2^{N_{payload}^1}$ realizations of the $N_{payload}^1$ most significant bit (MSB) bits are mapped q times.

The second condition in Equation (8) ensures that, among the q resource set combinations corresponding to one realization of the $N_{payload}^1$ MSB bits, there are sufficient sequence combinations to map the remaining $2^{N_{payload}^2}$ realizations of the $2^{N_{payload}^2}$ least significant bit (LSB) bits of the UCI payload. The value of q can be any value that satisfies the above-described relations.

Consider the case discussed previously, when $N_{resource-sets}=6$, no value of q can meet the aforementioned constraints. Namely, applying Equation (7) results in $$\binom{6}{2} = 15 < 2^4 = 16,$$

so it is not possible to indicate 4 MSB bits of the UCI payload using resource sets knowledge. Now, while $$\binom{6}{2} = 15 > 2^3 = 8,$$

which is sufficient to indicate 3 MSB bits, applying Equation (8) results in $12^2=144<2^8=256$, which means that there are not sufficient sequence combinations per one resource combination to account for the remainder 8 LSB bits of the UCI payload.

However, considering $N_{resource\text{-}sets}=7$, applying Equations (7) and (8) results in $$\binom{7}{2} = 21 \geq 2^4 = 16$$

and $12^2 = 144 \geq 2^7 = 128$, which means that one such mapping is possible. In this case, the mapping procedure can be performed as follows.

1. Initialize UCI payload parameters $P^1$ and $P^2$ to be 0, and set $N_{payload}^1$ and $N_{payload}^2$ to the target values.
2. Initialize resource set parameter $r^{param}=0$.
3. Initialize sequence combination parameter $sc^{param}=0$.
4. While $P^1 \cdot 2^{N_{payload}^2} + P^2 \leq 2^{N_{payload}}$:
   a. Set $r = r^{param}$;
   b. Set $sc = sc^{param}$;
   c. Assign UCI payload equal to the binary representation of P to the SO combination with resource sets corresponding to the resource set combination index r and with sequence combination corresponding to the sequence combination index sc;
   d. Increment $P^2$;
   e. Increment $sc^{param}$; and
   f. If $sc^{param} > (N_{sequences}^{resource\text{-}set})^N$ or $P^2 > 2^{N_{payload}^2} - 1$:
      i. Set $sc^{param}=0$,
      ii. Increment $r^{param}$, and
      iii. If $P^2 > 2^{N_{payload}^2} - 1$.
         1. Increment $P^1$, and
         2. Set $P^2=0$.

Mapping 2

In accordance with an embodiment of the disclosure, the UCI payload size may be split into two parts, i.e., $N_{payload} = N_{payload}^1 + N_{payload}^2$. Given a set of $N_{resource\text{-}sets}$ resource sets for sending the PUCCH, the UE selects one of the resource sets, and then a selection of N sequences is made out of this resource set to represent the UCI payload. In this case, the selection of one resource set already reveals a level of information about the UCI payload. In order for the $N_{payload}^1$ bits of the UCI payload to be revealed by the choice of the resource set, the constraints in Equation (9) should be met.

$$N_{resource\text{-}sets} \geq 2^{N_{payload}^1} \quad (9)$$

In addition, the number of sequence combinations within each resource set should be sufficient to accommodate revealing the remaining $N_{payload}^2$ bits of the UCI payload. This means the constraints in Equation (10) should be met.

$$\binom{N_{sequences}^{resource\text{-}set}}{N} \geq 2^{N_{payload}^2} \quad (10)$$

Table 7 below provides an analysis of an amount of resource sets used for different values of N, where $N_{payload}=11$ and $N_{sequences}^{resource\text{-}sets}=12$.

TABLE 7

| N | 3 | 2 | 3 | 4 | 5 |
|---|---|---|---|---|---|
| $N_{payload}^2 = \left\lfloor \binom{12}{N} \right\rfloor$ | 3 | 6 | 7 | 7 | 8 |
| $N_{payload}^1 = 11 - N_{payload}^2$ | 8 | 5 | 4 | 4 | 3 |
| $N_{resource\text{-}sets} = 2^{N_{payload}^1}$ | 512 | 32 | 16 | 16 | 8 |

To facilitate this mapping, the notion of a sequence combination is applied per resource set index $s_{res}$. Similar to the SO combination index, this index indicates the selection of a pair of sequence indices within one resource set. Namely, assume a set of $N_{sequences}^{resource\text{-}sets}$ sequences within a resource set. Therefore, one selection of N such sequences may be described as a set of N indices, $k_i$, $i=0, \ldots, N-1$, where $k_i \in \{1, \ldots, N_{sequences}^{resource\text{-}sets}\}$, and $k_i < k_i$ for all i. For each combination of N sequences, a corresponding unique index can be computed as shown in Equation (11).

$$sc_{res} = \sum_{i=0}^{N-1} \left\langle \begin{array}{c} N_{sequences}^{resource\text{-}sets} - k_i \\ N - i \end{array} \right\rangle \quad (11)$$

In Equation (11), $$\left\langle \begin{array}{c} n \\ k \end{array} \right\rangle = \begin{cases} \binom{n}{k} & n \geq k \\ 0 & \text{otherwise} \end{cases}.$$

Based on the foregoing, the mapping operation may be performed as follows.
1. Initialize UCI payload parameters $P^1$ and $P^2$ to be 0, and set $N_{payload}^1$ and $N_{payload}^2$ to the target values.
2. Initialize sequence combination parameter $sc^{param}=0$.
3. While $P^1 \cdot 2^{N_{payload}^2} + P^2 \leq 2^{N_{payload}}$:
   a. Set $sc = sc^{param}$;
   b. Set $P = P^1 \cdot 2^{N_{payload}^2} + P^2$;
   c. Assign UCI payload equal to the binary representation of P to the resource set with index equal to PI and SO combination within the resource set corresponding to the sequence combination per resource set index $sc_{res}$ corresponding to the sequence combination index sc;
   d. Increment $P^2$;
   e. Increment $sc^{param}$; and
   f. If $$sc^{param} > \binom{N_{sequences}^{resource\text{-}set}}{N} \text{ or } P^2 > 2^{N_{payload}^2} - 1:$$

i. Set $sc^{param}=0$, and
   ii. If $P^2 > 2^{N_{payload}^2} - 1$:
      1. Increment $P^1$, and
      2. Set $P=0$.

Mapping 3

In accordance with an embodiment of the disclosure, as another mapping alternative, the above-described operations of Mapping 2 are generalized by allowing a UE to send sequences using multiple resources, not just one.

More specifically, in order to transmit N sequences, the UE selects a set of M resource sets out of the available $N_{resource-sets}$. Thereafter, the UE selects N sequences from the $(N_{sequences}^{resource-sets})^M$ available sequences. That is, by selecting resource sets, partial information about the UCI payload can be inferred.

Specifically, let $N_{payload}=N_{payload}^1+N_{payload}^2$. Then, in order to reveal $N_{payload}^1$ bits out of the UCI payload from resource set selection, the constraints in Equation (12) should be met.

$$\binom{N_{resource-sets}}{M} \geq 2^{N_{payload}^1} \quad (12)$$

Thereafter, to convey the rest of the payload bits through sequence selection, the constraints in Equation (13) should be met.

$$\binom{(N_{sequences}^{resource-set})^M}{N} \geq 2^{N_{payload}^2} \quad (13)$$

Selecting the sequences among the set of M selected resource sets can be done by using the notion of SOs provided above. Namely, the pool of SOs may be constructed by considering all sequences in all M resource sets, and the set of SOs can be ordered according to any of the ordering mechanisms described above. Thereafter, the UCI payload is mapped to sequences as follows:
1. The $N_{payload}^1$ MSBs of the UCI payload are mapped to resource set selections using the notion of resource set combination index.
2. The $N_{payload}^2$ LSBs of the UCI payload are mapped to SO combinations using the notion of SO combination index.

Within a set of M resource sets, there are $$\binom{(N_{sequences}^{resource-set})^M}{N}$$

possible selections of N sequences. To help identify these combinations, the notion of sequence combination index s as defined above may be used, with the following modification.

First, the ordering of the resource set indices of the M resource sets are identified. Next, a pool of SOs is constructed by listing all SOs within the set of M resource sets. SOs within the pool are ordered in a particular ordering, e.g., RSTSI. Herein, it is assumed that the pool of SO is of size $$S = \binom{(N_{sequences}^{resource-set})^M}{N}.$$

Thereafter, one selection of N SOs of the pool of SOs are described as a set of N indices, $k_i$, i=0, ..., N−1, where $k_i \in \{1, ..., S\}$ and $k_i < k_{i+1}$ for all i. For each combination of N SOs, a corresponding unique index can be computed as shown in Equation (14).

$$sc = \sum_{i=0}^{N-1} \left\{ \begin{array}{c} S - k_i \\ N - i \end{array} \right\} \quad (14)$$

In Equation (14), $$\left\{ \begin{array}{c} n \\ k \end{array} \right\} = \begin{cases} \binom{n}{k} & n \geq k \\ 0 & \text{otherwise} \end{cases}.$$

The above-described resource set index may also re-used. Namely, this index may indicate the selection of M resource indices. Assuming a set of $N_{resource-sets}$ resource sets, one selection of M resource sets may be described as a set of M indices, $k_i$, i=0, ..., M−1, where $k_i \in \{1, ..., N_{resource-sets}\}$ and $k_i < k_{i+1}$ for all i. For each combination of M resource sets, a corresponding unique index can be computed as shown in Equation (15).

$$r_{res} = \sum_{i=0}^{M-1} \left\{ \begin{array}{c} N_{resource-sets} - k_i \\ M - i \end{array} \right\} \quad (15)$$

Based on the foregoing, the mapping operation may be performed as follows.
1. Initialize UCI payload parameters $P^1$ and $P^2$ to be 0, and set $N_{payload}^1$ and $N_{payload}^2$ to the target values.
2. Initialize resource set parameter $r^{param}=0$.
3. Initialize sequence combination parameter $sc^{param}=0$.
4. While $P^1 \cdot 2^{N_{payload}^2} + P^2 \leq 2^{N_{payload}}$:
    a. Set $r=r^{param}$;
    b. Set $sc=sc^{param}$;
    c. Set $P=P^1 \cdot 2^{N_{payload}^2} + P^2$;
    d. Assign UCI payload equal to the binary representation of P to the SO combination with resource sets corresponding to the resource set combination index r and with sequence combination corresponding to the sequence combination index sc;
    d. Increment $P^2$;
    e. Increment $sc^{param}$; and
    f. If $sc^{param} > (N_{sequences}^{resource-sets})^N$ or $P^2 > 2^{N_{payload}^2}-1$:
        i. Set $sc^{param}=0$,
        ii. Increment $r^{param}$, and
        iii. If $P^2 > 2^{N_{payload}^2}-1$:
            1. Increment $P^1$, and
            2. Set $P^2=0$.

Figure 5:
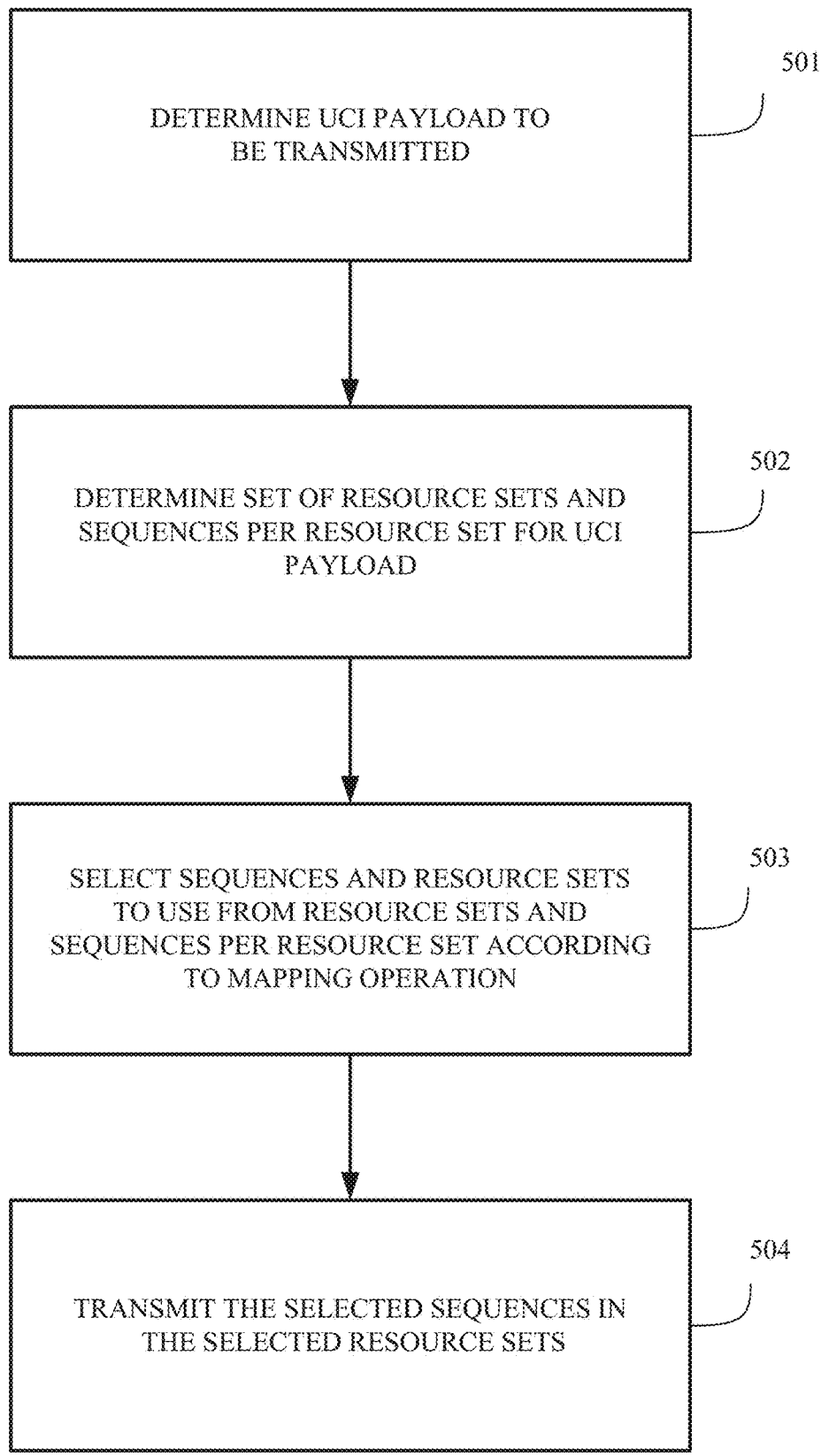
FIG. 5 is a flowchart illustrating UE operations, according to an embodiment.

FIG. 5 is a flowchart illustrating UE operations, according to an embodiment.

Referring to FIG. 5, in step 501, a UE determines UCI payload to be transmitted. For example, the UE identifies $N_{payload}$ bits constituting the UCI payload, as described above.

In step 502, the UE determines a set of resource sets and sequences per resource set to be used for sending UCI payload. As described above, the UE may determine N sequences and their corresponding transmission resources via a pool of available SOs. The UE may select a set of N SOs out of the pool, and those SOs allow the UE to determine the sequences and their corresponding resources.

In step 503, the UE selects sequences and resource sets to use from among the determined resource sets and sequences per resource set according to a mapping operation. For example, the mapping operation may include the operation describe above in mapping 1, mapping 2, or mapping 3.

In step 504, the UE transmits the selected sequences in the selected resource sets.

Figure 6:
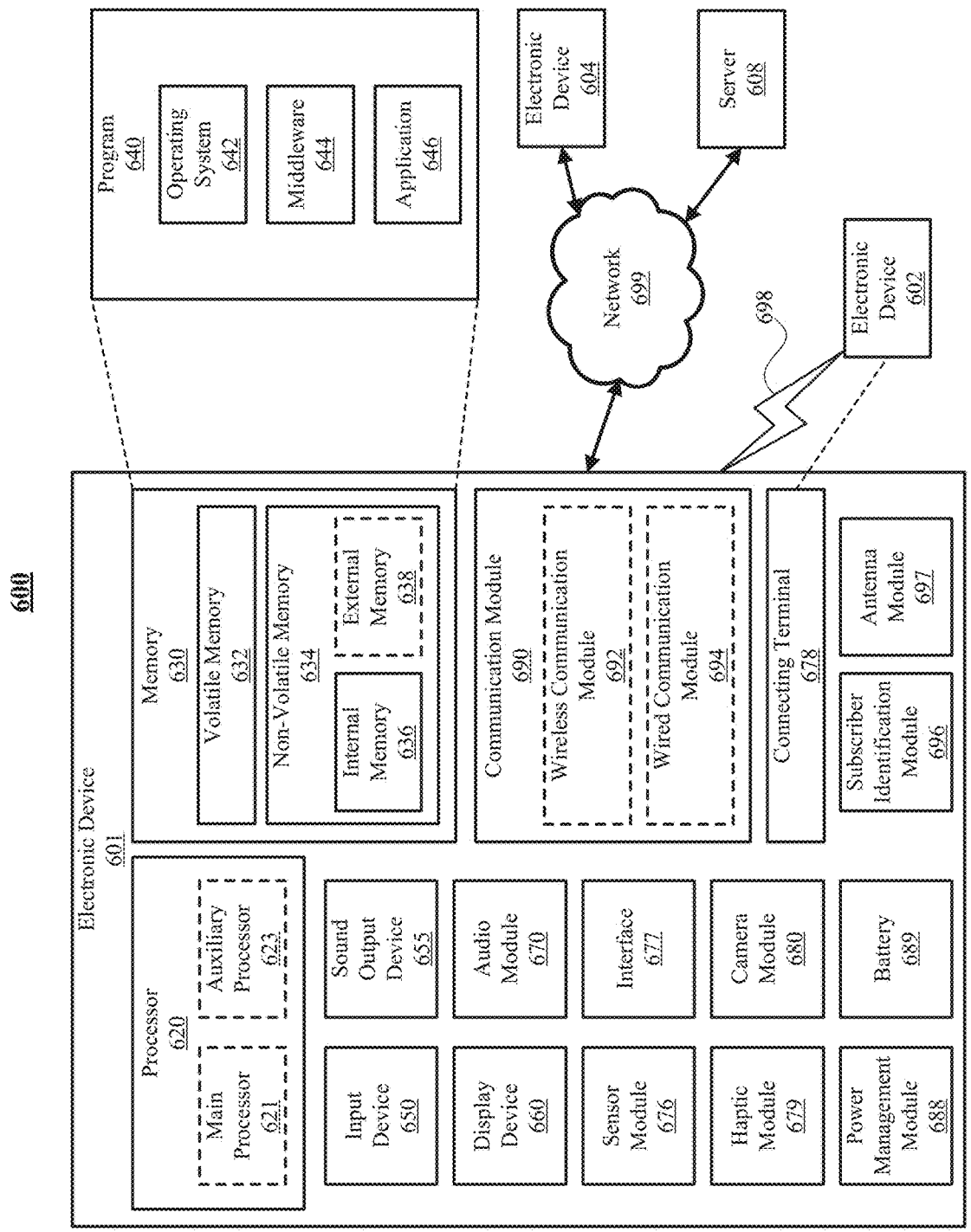
FIG. 6 is a block diagram of an electronic device in a network environment, according to an embodiment.

FIG. 6 is a block diagram of an electronic device in a network environment 600, according to an embodiment.

Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 640, a sound output device 655, a display device 660, an audio module 670, a sensor module 676, an interface 677, a haptic module 679, a camera module 680, a power management module 688, a battery 689, a communication module 690, a subscriber identification module (SIM) card 696, or an antenna module 694. In one embodiment, at least one (e.g., the display device 660 or the camera module 680) of the components may be omitted from the electronic device 601, or one or more other components may be added to the electronic device 601. Some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute software (e.g., a program 640) to control at least one other component (e.g., a hardware or a software component) of the electronic device 601 coupled with the processor 620 and may perform various data processing or computations. For example, processor 620 may execute software to control at least one other component of the electronic device 601 coupled with the processor 620 to perform the method illustrated in the FIG. 5.

As at least part of the data processing or computations, the processor 620 may load a command or data received from another component (e.g., the sensor module 646 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. The display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. The audio module 670 may obtain the sound via the input device 650 or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. The interface 677 may include, for example, a high-definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. The haptic module 679 may include, for example, a motor, a piezoelectric element, or an electrical stimulator.

The camera module 680 may capture a still image or moving images. The camera module 680 may include one or more lenses, image sensors, image signal processors, or flashes. The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. The antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method performed by a user equipment (UE), the method comprising:
    determining an uplink control information (UCI) payload to be transmitted;
    determining, based on the UCI payload to be transmitted, a grouping of resource sets and sequences, each sequence corresponding to a resource set, wherein determining the grouping of resource sets and sequences comprises:
        selecting a set of sequence opportunities (SOs) from a pool of available SOs, wherein the pool of available SOs includes S, where the SOs in the pool are indexed from 1 to S, and wherein selecting the set of SOs from the pool of available SOs includes selecting N SOs from the pool, and
        determining the grouping of resource sets and sequences per resource set based on the selected set of SOs;
    separating the UCI payload into two parts $N_{payload}^1 + N_{payload}^2$, such that $$\binom{N_{resource-sets}}{M} \geq 2^{N_{payload}^1} \text{ and } \binom{(N_{sequences}^{resource-set})^M}{N} \geq 2^{N_{payload}^2},$$

wherein $N_{resource-sets}$ indicates a number of resource sets in the selected N SOs, $N_{sequences}^{resource-set}$ indicates a number of resource set sequences for in the selected N SOs, and M indicates a number of resource sets selected from the $N_{resource-sets}$;
    selecting one or more resource sets and one or more sequences from among the determined grouping of resource sets and sequences, according to a mapping operation, for transmitting the UCI payload; and
    transmitting the selected one or more sequences as part of a UCI payload transmission.

2. The method of claim 1, wherein each SO in the in the pool corresponds to a unique transmission of a sequence or a unique sequence index.

3. The method of claim 1, wherein each of the available SOs in the SO pool includes a combination of a resource set and a sequence index.

4. The method of claim 3, wherein the pool of available SOs includes a plurality of SOs ordered using resource-set-then-sequence-index (RSTSI) or sequence-index-then-resource-set (SITRS).

5. The method of claim 3, wherein each of the available SOs in the SO pool includes a unique resource set.

6. The method of claim 5, further comprising determining a resource set combination index $r_{res}$ for the selected N SOs using:

$$r_{res} = \sum_{i=0}^{N-1} \binom{N_{resource-sets} - k_i}{N - i}$$

wherein $N_{resource-sets}$ indicates a number of resource sets, $k_i$, i=0, ..., N−1, $k_i \in \{1, ..., S\}$, and $k_i < k_{i+1}$ for all i, and $$\binom{n}{k} = \begin{cases} \binom{n}{k} & n \geq k \\ 0 & \text{otherwise} \end{cases}.$$

7. The method of claim 6, wherein the mapping operation is performed according to:
    decimal value of a binary selection vector=the resource set combination index $r_{res}$,
    wherein the selection of N resource sets in the selected N SOs is represented by a binary selection vector of length $N_{resource-sets}$, where a 1 in an ith bit position indicates that an ith resource set is selected, and a 0 in the ith bit position indicates that the ith resource set is not selected.

8. The method of claim 5, further comprising determining a sequence combination index sc for the selected N SOs using:

$$sc = \sum_{i=1}^{N} d_i \cdot (N_{sequences}^{resource-set})^{i-1}$$

wherein $N_{sequences}^{resource-set}$ indicates a number of resource set sequences, $d_i$ represents an index of a sequence selected from an ith resource set, and $d_i \in \{1, ..., N_{sequences}^{resource-set}\}$.

9. The method of claim 8, wherein the mapping operation is performed according to the determined sequence combination index sc.

10. The method of claim 1, further comprising at least one of:
    determining a sequence combination index sc for the selected N SOs using:

$$sc = \sum_{i=0}^{N-1} \binom{S - k_i}{N - i}$$

wherein $k_i$, i=0, ..., N−1, $k_i \in \{1, ..., S\}$, and $k_i < k_{i+1}$ for all i, and $$\binom{n}{k} = \begin{cases} \binom{n}{k} & n \geq k \\ 0 & \text{otherwise} \end{cases};$$

or determining a resource set combination index $r_{res}$ for the selected N SOs using:

$$r_{res} = \sum_{i=0}^{N-1} \binom{N_{resource-sets} - k_i}{M - i}$$

wherein $N_{resource-sets}$ indicates a number of resource sets.

11. The method of claim 10, wherein the mapping operation is performed according to the at least one of the determined sequence combination index sc or the determined resource set combination index $r_{res}$.

12. A method performed by a user equipment (UE), the method comprising:
  determining an uplink control information (UCI) payload to be transmitted;
  determining, based on the UCI payload to be transmitted, a grouping of resource sets and sequences, each sequence corresponding to a resource set, wherein determining the grouping of resource sets and sequences comprises:
    selecting a set of sequence opportunities (SOs) from a pool of available SOs, wherein the pool of available SOs includes S, where the SOs in the pool are indexed from 1 to S, and wherein selecting the set of SOs from the pool of available SOs includes selecting N SOs from the pool, and
    determining the grouping of resource sets and sequences per resource set based on the selected set of SOs;
  determining an SO combination index r for the selected N SOs using:

$$r = \sum_{i=0}^{N-1} \binom{S - k_i}{N - i}$$

wherein $k_i$, i=0, ..., N−1, $k_i \in \{1, ..., S\}$, and $k_i < k_{i+1}$ for all i, and $$\binom{n}{k} = \begin{cases} \binom{n}{k} & n \geq k \\ 0 & \text{otherwise} \end{cases};$$

selecting one or more resource sets and one or more sequences from among the determined grouping of resource sets and sequences, according to a mapping operation, for transmitting the UCI payload; and
  transmitting the selected one or more sequences as part of a UCI payload transmission.

13. The method of claim 12, wherein the mapping operation includes mapping the UCI payload to the SO combination index r.

14. A method performed by a user equipment (UE), the method comprising:
  determining an uplink control information (UCI) payload to be transmitted;
  determining, based on the UCI payload to be transmitted, a grouping of resource sets and sequences, each sequence corresponding to a resource set, wherein determining the grouping of resource sets and sequences comprises:
    selecting a set of sequence opportunities (SOs) from a pool of available SOs, wherein the pool of available SOs includes S, where the SOs in the pool are indexed from 1 to S, and wherein selecting the set of SOs from the pool of available SOs includes selecting N SOs from the pool, and
    determining the grouping of resource sets and sequences per resource set based on the selected set of SOs;
  separating the UCI payload into two parts $$N^1_{payload} + N^2_{payload},$$

such that $N_{resource-ses} \geq 2^{N^1_{payload}}$ and $\binom{N^{resource-set}_{sequences}}{N} \geq 2^{N^2_{payload}},$ wherein $N_{resource-sets}$ indicates a number of resource sets in the selected N SOs, and $N_{sequences}^{resource-sets}$ indicates a number of resource set sequences for in the selected N SOs;
  selecting one or more resource sets and one or more sequences from among the determined grouping of resource sets and sequences, according to a mapping operation, for transmitting the UCI payload; and
  transmitting the selected one or more sequences as part of a UCI payload transmission.

15. The method of claim 14, further comprising determining a sequence combination index $sc_{res}$ for the selected N SOs using:

$$sc_{res} = \sum_{i=0}^{N-1} \binom{N^{resource-set}_{sequences} - k_i}{N - i}$$

wherein $N_{sequences}^{resource-sets}$ indicates a number of resource set sequences, $k_i$, i=0, ..., N−1, $k_i \in \{1, ..., S\}$, and $k_i < k_{i+1}$ for all i, and $$\binom{n}{k} = \begin{cases} \binom{n}{k} & n \geq k \\ 0 & \text{otherwise} \end{cases}.$$

16. The method of claim 15, wherein the mapping operation is performed according to the determined sequence combination index $sc_{res}$.

17. The method of claim 14, wherein each SO in the in the pool corresponds to a unique transmission of a sequence or a unique sequence index.

18. The method of claim 14, wherein each of the available SOs in the SO pool includes a combination of a resource set and a sequence index.

19. The method of claim 18, wherein the pool of available SOs includes a plurality of SOs ordered using resource-set-then-sequence-index (RSTSI) or sequence-index-then-resource-set (SITRS).

20. The method of claim 18, wherein each of the available SOs in the SO pool includes a unique resource set.

* * * * *